United States Patent Office 2,941,982
Patented June 21, 1960

2,941,982
PROCESS OF PRODUCING LINEAR UNSATURATED POLYESTERS

Walter Gumlich, Gottfried Sprock, and Karl Mönkemeyer, Marl, Germany, assignors to Chemische Werke Huls Aktiengesellschaft, Marl, Germany, a corporation of Germany No Drawing. Filed Nov. 7, 1955, Ser. No. 545,538

Claims priority, application Germany Dec. 4, 1954

1 Claim. (Cl. 260—75)

Our application Ser. No. 464,641, filed Oct. 25, 1954, relates to linear unsaturated polyesters in which the alcohol component consists wholly or partly of a polycyclic multivalent alcohol in which the hydroxyl groups are distributed on different rings of a suitable condensed ring system.

These linear unsaturated polyesters together with vinyl compounds give unsaturated polyester resins which can be polymerized without the exclusion of air and without heat to produce non-adhesive products. They may be applied as simple coatings on surfaces and dried at room temperature and preferably in contact with the atmosphere to non-adhesive films, particularly if the coating layer is thin.

Suitable polycyclic multivalent alcohols are for example the diols obtained from cyclopentadiene by treatment with carbon monoxide and hydrogen followed by hydrogenation, the diols obtained from the adducts formed of cyclopentadiene and unsaturated alcohols according to the Diels-Adler principle by treatment with carbon monoxide and hydrogen followed by hydrogenation and the alcohols produced by etherifying a multivalent naphthol with, for example, chloroethanol followed by hydrogenation. In all of the described alcohols there are hydroxyl groups on the side chains.

It has been found that valuable linear unsaturated polyesters are obtainable from unsaturated dicarboxylic acids and polycyclic multivalent alcohols by reacting unsaturated dicarboxylic acids and the diesters of endocyclic multivalent alcohols at elevated temperature. Suitable diesters of endocyclic multivalent alcohols are the products obtained by the treatment of dicyclopentadiene or its functional derivatives containing a double bond, in which the other double bond is associated with water or a monobasic organic acid, with monobasic organic acids having not more than 3 carbon atoms in the presence of catalysts. Such diesters have the formula (a) 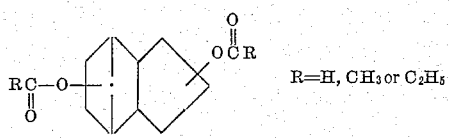

R=H, CH₃ or C₂H₅

Other suitable diesters are the products obtainable by treating unsaturated endocyclic alcohols or their ester organic acids having at least 3 carbon atoms with organic per acids at moderately elevated temperatures. Such compounds have the formula (b) 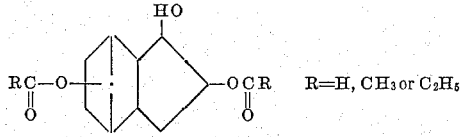

R=H, CH₃ or C₂H₅

The last named diester trivalent endocyclic alcohols, contrary to expectation, can be used for the synthesis of linear unsaturated polyesters by the use of molar amounts of the dicarboxylic acids. The 3-hydroxyl group of these trivalent alcohols is not converted so that unwanted crossslinked products are not produced.

The conversion of the diesters of multivalent endocyclic alcohols with unsaturated dicarboxylic acids is effected in the known way at temperatures of about 150° C. or higher. It is advantageous to add lower monovalent alcohols, for example butyl alcohol, which form volatile esters with the lower fatty acids having not more than 3 carbon atoms which are formed during the reaction, to the reaction mixture. It may be advantageous also to add stabilizers such as hydroquinone, trichloroethyl phosphorous acid ester and the like to the reaction mixture. Under some circumstances the reaction can be facilitated by the addition of esterification catalysts such as, for example, p-toluene sulfonic acid as well as by the removal of the formed volatile materials with the aid of a stream of inert gas. The linear unsaturated polyesters may be modified in the known manner by substituting a part of the unsaturated dicarboxylic acid by a saturated dicarboxylic acid as well as by substituting a part of the diester of the endocyclic multivalent alcohol by diols such as for example ethylene glycol, diethylene glycol, 1.3-butylene glycol, 1.4-butane diol, 1.6-hexane diol and further by the addition of monobasic carboxylic acids and monovalent alcohols.

The linear unsaturated polyester products are generally solids, especially when the diesters of endocyclic multivalent alcohols are used as the alcohol component. The products are non-adhesive and can easily be crushed. As distinguished from known unsaturated polyesters they have an unlimited stability in storage and they are easily packed and handled. If the alcohol components of the linear unsaturated polyesters are modified by the addition of the usually used diols to the diesters of the endocyclic multivalent alcohols the advantageous properties do not appear to be so marked. Still comparatively insignificant amounts of the diesters of the endocyclic multivalent alcohols in the alcohol components of the linear unsaturated polyesters effect a remarkable improvement of the property of non-adhesiveness.

The present linear unsaturated polyesters with vinyl compounds such as styrene, alkylstyrenes, chlorostyrenes, vinyl naphthalene, vinyl acetates, etc. yield unsaturated polyester resins which can be polymerized at room temperature to non-adhesive products with the aid of catalysts and accelerators, if necessary. Suitable catalysts are organic peroxides, redox systems such as benzoyl peroxide+tertiary amine and under some circumstances an accelerating dryer such as cobalt naphthenate. Thinners, softeners, developers, fillers, pigments, etc. may be added to the resins.

The diesters of the endocyclic multivalent alcohols used for the production of the linear unsaturated polyesters are more easily accessible than the known polycyclic multivalent alcohols which have been suggested for the production of air drying polyester resins and in which the hydroxyl groups are located on different rings of a condensed ring system and on a lateral chain of the ring system.

The invention is illustrated by the following specific examples.

Example 1

A mixture of 98 parts by weight of maleic acid anhydride, 296 parts by weight of phthalic acid anhydride, 672 parts by weight of a compound of the formula (c) 

445 parts by weight of butyl alcohol, 0.2 part by weight of hydroquinone and 0.5 part by weight of trichloroethyl phosphorous acid ester are heated at 190–195° C. for 15 hours with stirring and the passage therethrough of a stream of nitrogen. The compound represented by the Formula (c) above is obtainable by heating dicyclopentadiene with formic acid in the presence of perchloric acid to boiling for one hour, washing the reaction product with 10% sodium carbonate solution and then with water, fractionating under a pressure of 2 mm. of mercury and collecting the fraction which distills at 142–144° C. The computed amount of formic acid butyl ester and approximately the computed amount of water are expelled together with excess of butyl alcohol. An unsaturated polyester product is obtained which appears, after cooling, as a white, non-adhesive, dry mass which is easily crushed.

70 parts by weight of this unsaturated polyester product are stirred with 30 parts by weight of styrene until the mixture is homogeneous. The resulting almost colorless, clear solution has an acid number of 27. This solution is mixed with 4 parts by weight of a 40% solution of methylethylketone peroxide in dimethyl phtalate as catalyst and 2 parts by weight of a 10% solution of cobalt naphthenate in toluene as accelerator. The mixture is coated on wood, glass or iron to a thickness of less than 100 mu. If the mixture is to be applied with a spray gun it is preferably diluted with 10 parts by weight of styrene, 7.5 parts by weight of butanol and 2.5 parts by weight of ethyl glycol acetate.

The coating process works well on all materials. As distinguished from coatings with normal unsaturated polyester resins which are not air drying there is no pitting of the coating. The thin layer becomes dust-dry in 30–45 minutes and non-adhesive in 6–7 hours. After 24 hours the coating may be polished while wet with gasoline and then polished with commercial polishing paste to a high luster.

Example 2

A mixture of 98 parts by weight of maleic acid anhydride, 296 parts by weight of phthalic acid anhydride, 786 parts by weight of the diformate of tricyclodecane triol of the formula
(d)

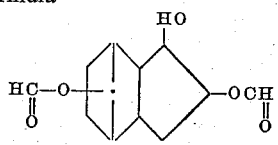

630 parts by weight of butyl alcohol, 0.2 part by weight of hydroquinone and 0.5 part by weight of trichloroethyl phosphorous acid ester is heated at 190° C. for 10 hours while stirring and passing a stream of nitrogen. The computed amount of formic acid butyl ester as well as approximately the computed amount of water escape with the excess of butyl alcohol. The unsaturated polyester product is a white, non-adhesive dry mass which is easily crushed.

65 parts by weight of the polyester product described above are stirred with 35 parts by weight of styrene until a homogeneous solution is formed. This solution is clear and almost colorless and has an acid number of 17. The solution is mixed with 4 parts by weight of a 40% solution of methylethyl ketone peroxide in dimethylphthalate as catalyst and 2 parts by weight of a 10% solution of cobalt naphthenate in toluene as accelerator. The resulting mixture is coated on wood, glass or iron to a thickness of less than 100 mu. For application with a spray gun it is preferable to thin it with 10 parts by weight of styrene, 7.5 parts by weight of butanol and 2.5 parts by weight of ethylglycol acetate. The coating process works well on all materials. As distinguished from coatings of normal polyester resins which are not air-drying the new coatings are free of pitting. The coatings are dust-dry in 15 minutes and non-adhesive after 2 hours. After 12–15 hours the coatings may be polished while wet with gasoline and then polished with commercial polishing paste to a high gloss.

We claim:

Process for the production of a linear unsaturated polyester which comprises reesterifying at a temperature within the range from 150° C. to 190° C. a diester of an endocyclic bivalent alcohol of the formula

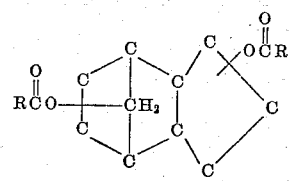

in which R is a member of the group consisting of hydrogen, methyl and ethyl, obtained by reacting one molecular proportion of dicyclopentadiene with at least two molecular proportions of a monobasic carboxylic acid having from 1 to 3 carbon atoms in the presence of perchloric acid as a catalyst, with an equimolecular proportion of a dicarboxylic acid composition consisting of phthalic acid anhydride and maleic acid anhydride.

References Cited in the file of this patent

UNITED STATES PATENTS

| | | |
|---|---|---|
| 2,106,452 | Bruson et al. | Jan. 25, 1938 |
| 2,417,100 | Bruson et al. | Mar. 11, 1947 |
| 2,817,673 | Roelen et al. | Dec. 24, 1957 |